United States Patent
Oyamada et al.

(10) Patent No.: US 7,593,014 B2
(45) Date of Patent: Sep. 22, 2009

(54) IMAGE PROCESSING APPARATUS AND GAME APPARATUS

(75) Inventors: Hideyuki Oyamada, Tokyo (JP); Ryosuke Masuda, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 917 days.

(21) Appl. No.: 10/478,231

(22) PCT Filed: May 21, 2002

(86) PCT No.: PCT/JP02/04921

§ 371 (c)(1), (2), (4) Date: Jun. 7, 2004

(87) PCT Pub. No.: WO02/095688

PCT Pub. Date: Nov. 28, 2002

(65) Prior Publication Data

US 2004/0209680 A1   Oct. 21, 2004

(30) Foreign Application Priority Data

May 21, 2001   (JP) ............................... 2001-151642

(51) Int. Cl.
*G06T 15/00* (2006.01)
(52) U.S. Cl. .................. 345/473; 345/474; 345/475
(58) Field of Classification Search .......... 345/473–475
See application file for complete search history.

(56) References Cited

U.S. PATENT DOCUMENTS

| | | | |
|---|---|---|---|
| 6,203,425 B1 | 3/2001 | Hayashi | |
| 7,382,267 B2 * | 6/2008 | Brendley et al. | 340/573.1 |
| 2004/0209680 A1 | 10/2004 | Oyamada et al. | |

FOREIGN PATENT DOCUMENTS

| | | |
|---|---|---|
| CN | 1270279 | 8/2006 |
| EP | 466 154 A2 | 1/1992 |
| JP | 7-178246 A | 7/1995 |
| JP | 9-231395 A | 9/1997 |
| JP | 10-305172 | 11/1998 |
| JP | 2001-052203 | 2/2001 |

(Continued)

OTHER PUBLICATIONS

Kyasao, "The World Soccer Championship," Gamest, Jul. 15, 1998, vol. 13, No. 18, p. 182.

(Continued)

*Primary Examiner*—Phu K Nguyen
(74) *Attorney, Agent, or Firm*—Finnegan, Henderson, Farabow, Garrett & Dunner, L.L.P.

(57) ABSTRACT

An image processing apparatus including image creation means (S14) for creating an animated image of a character in accordance with shape data of the character (S11) shifting with a predetermined motion in a virtual space, motion data (S12) indicating the predetermined action, and shift amount data (S13) of a shift amount for each of the predetermined actions of the character, and reproduction/display means (S16) for displaying the animated images of the characters on display means. The characters have shapes different in size. The motion data is common to all the characters. The shift amount data is set to a shift amount proportional to the character size. The reproduction/display means changes the reproduction speed (S15) of the animated image of the character created by the image creation means, in accordance with the shift amount data of the character.

15 Claims, 7 Drawing Sheets

FOREIGN PATENT DOCUMENTS

KR    1998-703821    12/1998

OTHER PUBLICATIONS

George Maestri, Digital Character Animation 2, vol. I: Essential Techniques, Aug. 1999, pp. 198, 199, 213, 214, 222, 231, and 232, Indianapolis, IN.

Armin Bruderlin et al., Goal-Directed, Dynamic Animation of Human Walking, Computer Graphics, Siggraph Conference Proceedings, vol. 23, No. 3, Jul. 1989, pp. 233-242.

European Search Report issued in European Application No. EP 02771766 on Jun. 8, 2005.

* cited by examiner

IMAGE PROCESSING APPARATUS AND GAME APPARATUS

TECHNICAL FIELD

This invention relates to an image processing apparatus and a game apparatus, particularly to a game apparatus which simulates team sports such as ball sports, and an image processing apparatus preferable for such game apparatus.

BACKGROUND ART

With regard to game apparatuses simulating team sports using game media (balls and the like) such as ball sports, including soccer, rugby, American football and basketball, as well as hockey which is similar to these ball sports, each team has a plurality of player characters and the team play of these player characters is realized by a user's manipulation of these game apparatuses.

In these game apparatuses, player characters are given different characteristics in their physiques and running speeds, thereby the user can enjoy developing game strategies. One way of expressing characteristics of the player characters is to provide each player characters with different data for actions to create images of each character, but this will require an enormous amount of data. Thereupon, to express "running" actions of the player characters, for example, it is considered possible to apply common data for motions such as arm-swinging and feet hitting the ground, for all the player characters. In this case, processing is performed so that each character changes its location in a virtual space while swinging its arms and hitting the ground with its feet.

However, if the player characters have physiques different in size, a shift amount of one step in the running motion must be proportional to a character's physique, otherwise, the shift amount of a player character having a large body will be too small considering the character's action of the legs, and the shift amount of a player character having a small body will be too large considering the character's action of the legs, thereby showing unnatural movements as if the feet are sliding on the ground.

Here, when the shift amount of one step in the running motion is made proportional to the physique of the player character, and if the common data for "running" is applied to all the player characters as described, the player character having a large body runs at a fast speed and the player having a small body runs at a slow speed. Up to now, however, it has been impossible to provide different player characters with different characteristics for the "running speeds" irrespective of the physiques of the characters, and it is also impossible to realize such characteristics in images.

Further, among game apparatuses simulating team sports such as ball sports, including soccer, rugby, American football and basketball, as well as hockey which is similar to these ball sports, such game apparatuses are known for one user manipulating player characters on one team.

For example, a game apparatus is known whereby, when the user's team is controlling a game medium such as a ball, the user at all times manipulates a player character controlling the game medium. In this case, when the player character controlling the game medium passes it to another player character in accordance with the user's manipulation, the object player character of manipulation by the user changes from the passer to the receiver Thereby, even if the game medium is passed between the player characters, the user can continue to manipulate a player character who is controlling the game medium.

Nevertheless, the fact that the user can manipulate only the player character who is controlling the game medium, means that the user cannot enjoy developing game strategies such as requesting for receiving a pass or making other player characters take positions, resulting in a monotonous game.

There are other game apparatuses, for example, in which the player character which the user manipulates during a game is fixed so that the user's role in the team is specific. In this case, when the user manipulates a player character to pass the game medium to another player character, the user grasps the situation and makes his/her player character take another position or the user can request to receive the game medium while considering the next play.

Even with this configuration, the fact that the user manipulates only one player character during the game, may cause situations in which the user is barely involved in the game and becomes bored when his/her player character does not control the game medium or when the player character is positioned away from the game medium.

With regard to the game apparatuses simulating team sports such as ball sports, for example, soccer, rugby, American football and basketball, as well as hockey which is similar to these ball sports, plays such as a free kick in soccer are performed.

Here, a selection of a player character who is going to perform such a play has to be made prior to the action. In the case of conventional game apparatuses, an opponent user watches the same screen as the user. Accordingly, the opponent user can see the user's motion to make a selection, thereby, the opponent user knows which player character is going to perform the play. Therefore, with the conventional game apparatuses, the user cannot develop a game strategy, in cases of performing a free kick as described, to delay time for defense of the opponent team by delaying the time for the free-kick with feint actions by other same team players.

Furthermore, in the case of the game apparatuses simulating team sports such as ball sports, including soccer, rugby, American football and basketball, as well as hockey which is similar to these ball sports, it is necessary to use various types of pass actions appropriately, depending on game strategies and game situations. Accordingly, in the conventional game apparatuses, various pass actions are allotted to plural operational buttons: search pass buttons for automatic searching for a player character to whom the game medium is passed; and space pass buttons for sending the ball to a specific space. Use of these buttons achieves a variety of plays, such as passing the game medium to a specified player character or sending the game medium to a specific space (an area with no players from either team) and manipulating a same team player character to run into the space.

These conventional game apparatuses, however, require a great number of operational buttons just to pass the game medium. For example, to classify both search passing and space passing into a short pass type and a long pass type and to allot these passing types to buttons, four buttons are required. This will requires a fair amount of effort to learn the allocation and functions of buttons. As well, the user needs to be considerably skilled to be able to accurately perform different types of pass actions based on quick decisions.

It is an object of this invention to enhance enjoyment of a game apparatus simulating a team game such as soccer, as well as to provide an image processing apparatus therefor. More precise objects of the invention are as follows.

It is a first object of this invention to provide an image processing apparatus with which characters shifting in a virtual space with predetermined motions, can be realized in different sizes and with different shifting speeds irrespective of size while applying motion data which is common to all the characters.

It is a second object of this invention to provide a game apparatus in which the manipulation options are increased and so, the user can enjoy developing game strategies when a player character who is controlling the game medium makes a pass.

It is a third object of this invention to provide a game apparatus which is capable of delaying the timing of a play of a selected player character by making unselected same team player characters perform feint actions.

It is a fourth object of this invention to provide a game apparatus with which: the user can make a search pass and a through pass with one button; a short search pass and a short through pass can be made by similar manipulation; and a long search pass and a long through pass can be made by similar manipulation, thereby simultaneously enhancing the operability and the diversity of plays.

SUMMARY

To achieve the above objects, the image processing method of the present invention creates an animated image of a character in accordance with: shape data of the character; motion data indicating variations per unit of time of the shape data for a predetermined motion of the character in a virtual space; motion displaying speed data indicating a speed to display the predetermined motion in accordance with the motion data; shift amount data indicating a shift amount per unit of motion for the predetermined motion of the character; and ability data indicating a shift amount per unit of time for the predetermined motion of the character.

Size data indicating a character size in the virtual space and the ability data are individually set for different characters. This image processing method comprises: a step for creating second shift amount data by changing the shift amount data in accordance with the size data; a step for creating second motion displaying speed data by changing the motion displaying speed data in accordance with the ability data; and a step for creating, in accordance with the second shift amount data and the second motion displaying speed data, an animated image of the character shifting with the predetermined motions.

Regarding the above image processing method, it is desirable that a plurality of types of predetermined motions be set and the method further comprise a step for determining whether or not the changing of the motion displaying speed data is needed, in accordance with the types of the predetermined motions.

Regarding the above image processing method, it is desirable that a plurality of characters be displayed and, for a motion common to the plurality of characters, common motion data be provided to the plurality of characters irrespective of the character size.

The image processing method of the present invention creates an animated image of a running character in accordance with: shape data of the character; running motion data indicating variations per unit of time of the shape data of the running motion for the character in a virtual space; running motion displaying speed data indicating a speed to display the running motion in accordance with the running motion data; stride data indicating a shift amount of each stride for the running motion of the character; and running ability data indicating a distance traveled per unit of time for the running motion of the character.

Size data indicating a character size in the virtual space and the running ability data are individually set for different characters. This image processing method comprises: a step for creating second stride data by changing the stride data in accordance with the size data; a step for creating second running motion displaying speed data by changing the running motion displaying speed data in accordance with the running ability data; and a step for creating, in accordance with the second stride data and the second running motion displaying speed data, an animated image of the running character.

The image processing method of the present invention comprises: an image creating step for creating an animated image for each of a plurality of characters in accordance with shape data of the plurality of characters shifting with predetermined motions in a virtual space, motion data indicating the predetermined motions, and shift amount data indicating a shift amount for each of the predetermined motions of each character; and a displaying step for displaying the animated image of each of the characters on display means. The plurality of characters have shapes different in size, and the motion data is common to all the characters. The shift amount data is a shift amount proportional to the character size, and, in the image creating step, a reproduction speed of the animated image for each character changes in accordance with the shift amount data of the character.

The image processing method of the present invention comprises: an image creating step for creating an animated image for each of a plurality of characters in accordance with shape data of the plurality of characters that are set in different sizes and shifting with predetermined motions in a virtual space, motion data indicating the predetermined motions, and shift amount data indicating a shift amount for each of the predetermined motions of each character; and a displaying step for displaying the animated image of each of the characters on display means. In the image creating step, scaling of the shift amount data is performed and a reproduction speed of the animated image changes, in accordance with the character's size.

Regarding the image processing method, a plurality of types of predetermined motions may be set and the method may further comprise a determination step for determining whether or not to perform the scaling of the shift amount data in accordance with each character's size, depending on the types of the predetermined motions.

Regarding the image processing method, the image creating step may involve the scaling of the shift amount data by using the shape data.

The image processing apparatus of the present invention creates an animated image of a character in accordance with shape data of the character shifting with a predetermined motion in a virtual space, motion data indicating variations per unit of time of the shape data for the predetermined motion, and shift amount data indicating a shift amount per unit of motion for the predetermined motion of the character.

This image processing apparatus comprises: means for changing the reproduction speed of the animated image in accordance with the character size; and means for creating the animated image of the character by using the reproduction speed based on the character size.

Regarding the image processing apparatus, it is desirable that a plurality of types of predetermined motions be set and the apparatus further comprise means for determining whether or not the changing of the reproduction speed in accordance with the types of the predetermined motions.

Regarding the image processing apparatus, it is desirable that a plurality of characters be displayed and, for a motion common to the plurality of characters, common motion data be provided to the plurality of characters irrespective of the character size.

The image processing apparatus of the present invention comprises: image creation means for creating an animated image of a character in accordance with shape data of the character shifting with a predetermined motion in a virtual space, motion data indicating the predetermined motion, and shift amount data indicating a shift amount for each of the predetermined motions of the character; and display means for displaying a plurality of the animated images of the characters. A plurality of characters has shapes different in size, and the motion data is common to all the characters. The shift amount data is set to a shift amount proportional to the character size, and the image creation means changes a reproduction speed of the animated image of each character in accordance with the shift amount data of the character.

The image processing apparatus of the present invention is characterized in that it comprises: image creation means for creating an animated image for each of a plurality of characters in accordance with shape data of the plurality of characters that are set in different sizes and shifting with predetermined motions in a virtual space, motion data indicating the predetermined motions, and shift amount data of a shift amount for each of the predetermined motions of each character; and display means for displaying the animated image of each of the characters. The image creation means performs scaling of the shift amount data and changes a reproduction speed of the animated images, in accordance with the character's size.

Regarding the image processing apparatus, a plurality of types of predetermined motions may be set and the apparatus may further comprise determination means for determining whether or not to perform the scaling of the shift amount data in accordance with the character's size, depending on the types of the predetermined motions.

Regarding the image processing apparatus, the image creation means may perform the scaling of the shift amount data by using the shape data.

The game apparatus of the present invention is a game apparatus with which a user can manipulate a player character on one team in a team game using a game medium such as a ball. The game apparatus comprises: manipulation control means for controlling motions of the character manipulated by the user, in accordance with a manipulation signal for the relevant player character; control means for controlling motions of player characters other than the player character manipulated by the user; passing control means for controlling a pass action in accordance with a pass instruction by the user, when the player character manipulated by the user controls the game medium; determination means for determining when passing whether or not to change an object player character to be manipulated by the user, in accordance with a manipulation by the user; and object changing means for making a player character who is going to receive the game medium to become the object player character, when changing the object player character to be manipulated by the user in accordance with the determination by the determination means.

Regarding the game apparatus, when the determination means determines not to change the object player character of the manipulation by the user, the object player character of the manipulation by the user may be changed from the player character making the pass to the player character who is going to receive the game medium in accordance with a subsequent manipulation by the user.

Further, the game controlling method of the present invention is for a game apparatus with which a user can manipulate a player character on one team in a team game using a game medium such as a ball. The game controlling method executes: manipulation control processing for controlling motion of the character manipulated by the user, in accordance with a manipulation signal for the relevant player character; control processing for controlling motion of player characters other than the player character manipulated by the user; passing control processing for controlling a pass action in accordance with a pass instruction by the user, when the player character manipulated by the user controls the game medium; determination processing for determining when passing, whether or not to change an object player character to be manipulated by the user, in accordance with a manipulation by the user; and object changing processing for making a player character who is going to receive the game medium to become the object player character, when changing the object player character to be manipulated by the user in accordance with the determination made in the determination processing.

The game apparatus of the present invention is a game apparatus with which a first user and a second user respectively manipulate player characters on competing first and second teams respectively. The game apparatus comprises: means for selecting, from the first team, a plurality of candidates for a player character who will execute a predetermined play and displaying such candidates; means for accepting a selection of a player character who will execute the predetermined play, made by the first user in a manner that the second user cannot see which player character among the candidates is selected; means for displaying a feint action by a player character among the candidates, different from the selected player character; and means for making the selected player character execute the predetermined play and displaying such play.

Regarding the game apparatus, the means for accepting the selection made by the first user may display the selection on a display element such that only the first user can see.

The game apparatus may further comprise selection means with which the first user selects a player character who will execute the feint action.

Regarding the game apparatus, a plurality of player characters may be selected to execute the feint actions and the game apparatus may further comprise feint action execution sequence selection means, with which the first user selects an execution sequence of the feint actions for the plurality of player characters.

The game controlling method of the present invention is for a game apparatus with which a first and second users manipulate player characters on competing first and second teams respectively. The game controlling method comprises: a step for selecting and displaying, from the first team, a plurality of candidates for a player character who will execute a predetermined play; a step for accepting a selection of a player character who will execute the predetermined play, made by the first user in a manner that the second user cannot see which player character among the candidates is selected; a step for displaying a feint action by a player character among the candidates, different from the player character that was selected; and a step for making the selected player character execute the predetermined play and displaying such play.

The game controlling method may further comprise a step of accepting the selection, made by the first user, of a player character to execute the feint action.

Regarding the game controlling method, a plurality of player characters may be selected to execute the feint actions and the method may further comprise a step for accepting the selection, made by the first user, of a execution sequence of the feint actions for the plurality of player characters.

The game apparatus of the present invention is a game apparatus simulating a team game involving passing of a game medium such as a ball. The game apparatus comprises: pass instruction means for enabling to pass of the game medium in accordance with a manipulation by a user; pass direction specifying means for specifying a direction of passing the game medium; and search means for specifying a player character to whom the game medium is passed. When the pass instruction means and the search means are used simultaneously, the game medium is passed to the player character specified by the search means, whereas when the pass instruction means is operated without the search means being operated, the game medium is passed in a direction specified by the pass direction specifying means.

Regarding the game apparatus, the pass direction specifying means may determine a traveling direction of a player character manipulated by the user as the direction of passing the game medium.

Regarding the game apparatus, the pass direction specifying means may determine the direction specified by a key operation which is not related to a traveling direction of a player character manipulated by the user, as a direction of passing the game medium.

Regarding the game apparatus, a plurality of pass instruction means may be provided depending on passing distances, and if the search means is not operated when any one of the pass instruction means is operated, the game medium may be passed a distance that corresponds to the operated pass instruction means, in a direction specified by the pass direction specifying means.

Regarding the game apparatus, it is desired that a plurality of pass instruction means be provided and the search means specify a player character among same team player characters to whom the game medium is passed which is within a distance that corresponds to the operated pass instruction means among the plurality of pass instruction means. Moreover, a plurality of pass instruction means may be provided depending on passing distances.

Regarding the game apparatus, when the pass direction specifying means is operated, the search means may specify a player character among same team player characters to whom the game medium is passed who is in a direction specified by the pass direction specifying means.

Regarding the game apparatus, a path of travel for the game medium may be altered in accordance with the length of time during which the pass instruction means has been operated.

The game controlling method of the present invention is a game controlling method for a game apparatus simulating a team game involving passing of a game medium such as a ball, and the game apparatus comprises: pass instruction means for enabling to pass the game medium in accordance with a manipulation by a user; pass direction specifying means for specifying a direction of passing the game medium; and search means for specifying a player character to whom the game medium is passed. In this game controlling method, when the pass instruction means and the search means are used simultaneously, a pass is executed to the player character specified by the search means; and when the pass instruction means is operated without the search means being operated, a pass is executed in a direction specified by the pass direction specifying means.

In the game controlling method, the pass direction specifying means may determine a traveling direction of a player character manipulated by the user as the direction of passing the game medium.

In the game controlling method, the pass direction specifying means may determine the direction specified by a key operation which is not related a traveling direction of a player character manipulated by the user, as the direction of passing the game medium.

In the game controlling method, a plurality of pass instruction means may be provided depending on passing distances, and if the search means is not operated when any one of the pass instruction means is operated, the game medium may be passed by a distance that corresponds to the operated pass instruction means, in a direction specified by the pass direction specifying means.

In the game controlling method, it is desirable that a plurality of pass instruction means be provided, and the search means may specify a player character among same team player characters to whom the game medium is passed who is within a distance that corresponds to the operated pass instruction means among the plurality of pass instruction means. Further, a plurality of pass instruction means may be provided depending on passing distances.

In the game controlling method, when the pass direction specifying means is operated, the search means may specify a player character among same team player characters to whom the game medium is passed which is in a direction specified by the pass direction specifying means.

In the game controlling method, a path of travel for the game medium may be altered in accordance with the length of time during which the pass instruction means has been operated.

In these drawings, reference symbol 1 indicates a game apparatus main body; 2 indicates a controller; 3 indicates a subunit; 22 indicates operational buttons; 24 indicates an analog key (direction key); 39 indicates a submonitor; 81 indicates a search pass; 82 and 83 indicate spaces; and 113 indicates a main monitor.

DETAILED DESCRIPTION

Embodiments of this invention will be explained with reference to the drawings.

<External Structure of the Game Apparatus>

Figure 1:
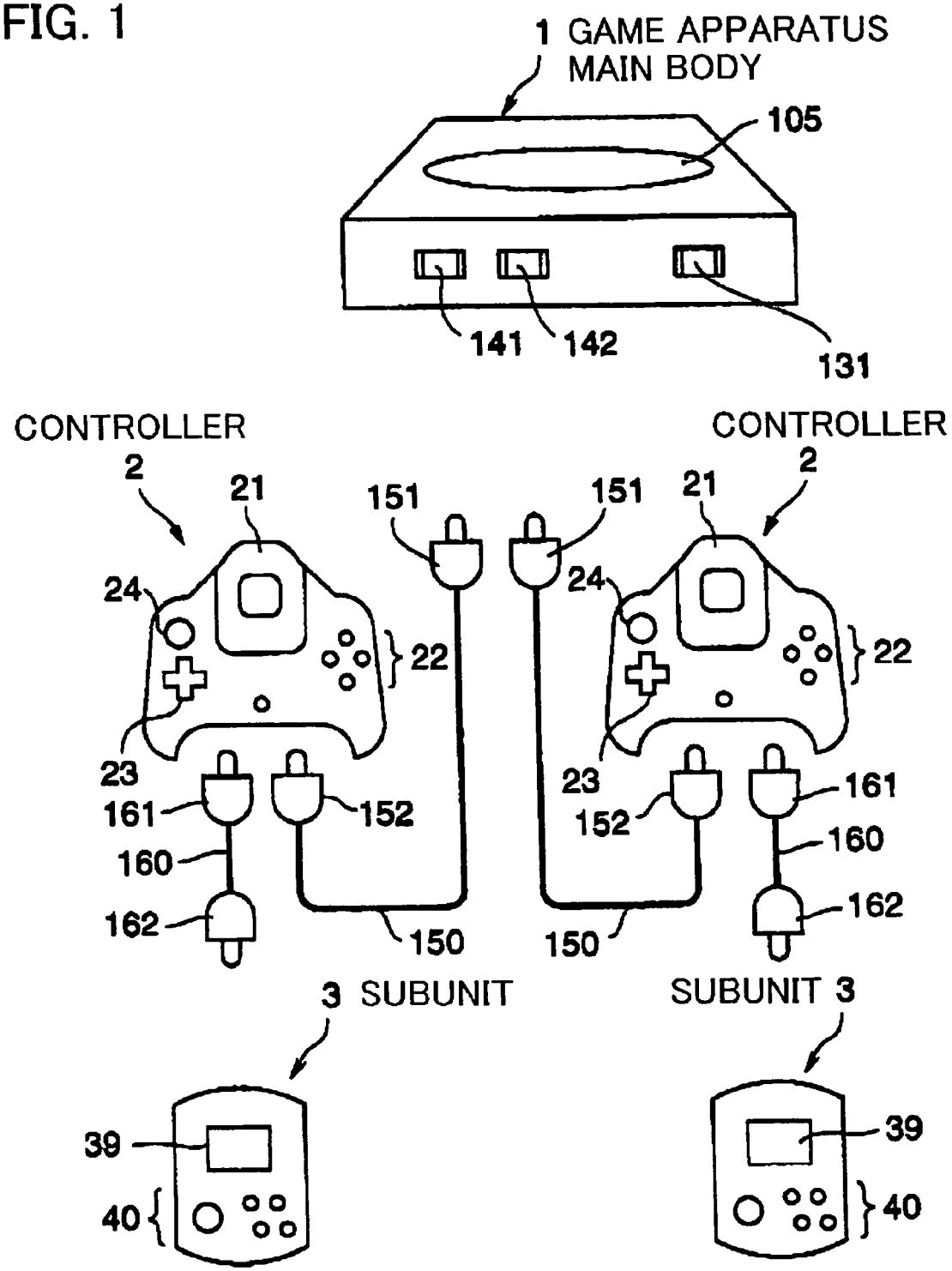
FIG. 1 is an external view of an image processing apparatus and a game apparatus comprising the image processing apparatus, according to an embodiment of this invention.

FIG. 1 is an external view of an image processing apparatus and a game apparatus comprising the image processing apparatus in the embodiments of this invention. The structure is common to Embodiments 1 to 4 which will be explained later, but this invention shall not be limited to this structure. This game apparatus is constructed by mutually connecting a game apparatus main body 1, a controller 2 and a subunit (subset) 3.

The game apparatus main body 1 is a controlling apparatus main body for controlling progression of a game including image processing. The game apparatus main body 1 comprises connectors 141 and 142 as well as a telecommunication circuit modular jack 131 so that plural controllers 2 can be connected to the game apparatus main body 1.

The game apparatus main body 1 further comprises a CD holder 105, therefore, a removable recording medium such as a CD-ROM can be inserted into the CD holder.

Each controller 2 has a structure of an operation unit which is manipulated by a user. Specifically, the controller 2 comprises a backup memory 21, an operational button group 22, an arrow key 23, an analog key 24 which serves as a direction key, and connectors for connecting the game apparatus main body 1 to the subunit 3.

The subunit 3 is for displaying a subimage or enabling the user to play a subgame with it. The subunit 3 comprises a submonitor for displaying images seen only by the user who is operating the subunit 3, an operational button group 40, and a connector for connecting the subunit 3 to the controller 2.

A connecting cable 150 has connectors 151 and 152 for connecting the game apparatus main body 1 to the controller 2. A connecting cable 160 has connectors 161 and 162 for connecting the controller 2 to the subunit 3.

<Internal Structure of Game Apparatus>

Figure 2:
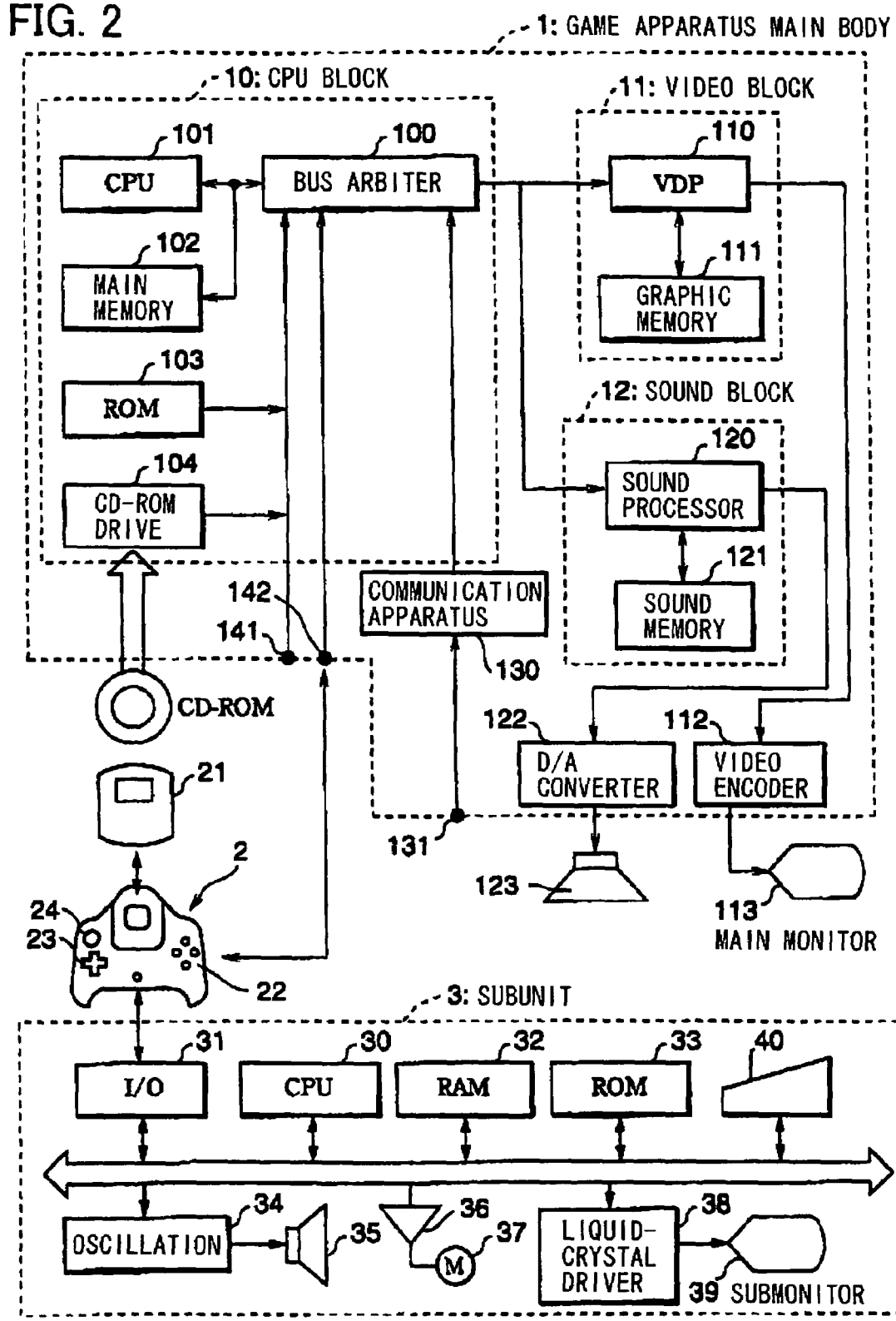
FIG. 2 is a control block of the image processing apparatus and the game apparatus comprising the image processing apparatus.

FIG. 2 is a control block of the image processing apparatus and the game apparatus comprising the image processing apparatus. As shown in FIG. 2, the game apparatus main body 1 comprises a CPU block 10, a video block 11 and a sound block 12.

The CPU block 10 comprises a bus arbiter 100, a CPU 101, a main memory 102, a boot ROM 103 and a CD drive 104. The bus arbiter 100 is composed such that it can control transmission and reception of data by allocating occupancy time of the bus to the devices which are connected to one another via the bus. The CPU 101 is composed such that it can access the backup memory 21 and the subunit 3 through the main memory 102, the boot ROM 103, the CD drive 104, the video block 11, the sound block 12, and the controller 2.

When power is supplied, the CPU 101 executes an initialization program stored in the boot ROM 103 and initializes the entire apparatus. Then, when the CPU 101 detects that a CD-ROM or the like is inserted into the CD drive 104, it transfers to the main memory 102 the operating system program data stored in the CD-ROM.

Subsequently, the CPU 101 operates in accordance with the operating system. Then, it transfers to the main memory 102 programs of an image processing method and a game processing method stored in the CD-ROM, and executes the programs.

The CPU 101 is further composed to be able to transfer image data for game processing to a graphic memory 111 as well as sound data to a sound memory 121. Processing performed by the program which is being executed by the CPU 101, includes: controlling input of operation signals from the controller 2 as well as communication data from a communication apparatus; controlling output of commands on the basis of the input to the subunit 13 and output of images executed by the video block 11; and controlling sound output executed by the sound block 12.

The main memory 102 is composed to be able to store the operating system program data and its program and to provide a work area for storing static variables and dynamic variables, and the like thereon. The boot ROM 103 is a storage area of an initial program loader.

The CD-ROM drive 104 is composed in a manner such that a removable CD-ROM can be inserted, and once the CD-ROM is inserted into the CD-ROM drive 104, the CD-ROM drive 104 outputs data of this fact to the CPU 101. The CD drive 104 can transfer the data of the CD-ROM under the control of the CPU 101.

Stored in the CD-ROM are programs for making the game apparatus execute the game processing, image data for displaying images, and sound data for outputting sounds. Without limitation to CD-ROMs, any other recoding medium that can be read by the game apparatus may be used. The game apparatus may be structured to transfer stacks of data, such as those stored in the CD-ROM, to the respective memories through the communication apparatus 130. With this structure of the game apparatus, data can be transferred from a fixed disk and the like, at a remote server.

The video block 11 comprises a Video Display Processor (VDP) 110, a graphic memory 111, and a video encoder 112. Image data that has been read from the CD-ROM as mentioned above, is stored in the graphic memory 111.

The VDP 110 is composed to be able to read image data necessary for displaying images from image data stored in the graphic memory 111, and execute coordinate conversion (geometry computing), texture mapping, display priority processing, shading, and the like, in accordance with information necessary for displaying the images supplied from the CPU 101, that is, command data, viewpoint data, light source position data, object designation data, object position data, texture designation data, texture density data, viewpoint conversion matrix data and the like. An alternative structure may be adopted where the CPU 101 executes the processing such as the coordinate conversion. In other words, the game apparatus may consider the computing abilities of the respective devices and decide which processing should be allotted to which device. The video encoder 112 is composed such that it can convert the image data created by the VDP 110 to predetermined television signals such as NTSC format and output the signals to the main monitor 113.

The sound block 12 comprises a sound processor 120, the sound memory 121, and a D/A converter 122. Sound data that was read from the CD-ROM as mentioned above, is stored in the sound memory 121.

The sound processor 120 reads, in accordance with the command data supplied from the CPU 101, the sound data such as waveform data stored in the sound memory 121 and executes various effects processing and digital-to-analog conversion and the like based on the Digital Signal Processor (DSP) function. The D/A converter is composed such that it can convert the sound data created by the sound processor 120 to an analog signal and output the signal to a speaker 123 which is connected externally.

The communication apparatus 130 consists of, for example, a modem and a terminal adapter. This communication apparatus 130 is composed in a manner that it can be connected to the game apparatus main body 1 and it can serve as an adapter for connecting the game apparatus main body 1 to an external circuit.

The communication apparatus 130 is composed such that it can receive data transmitted from a game supply server which is connected to a public circuit network and supply the data to the bus of the CPU block 10. As for the public circuit network, the line may be a subscriber's line or a leased line, and the circuit may be either wired or wireless.

The controller 2 is composed to be able to periodically convert the manipulation status from the operational button group 22 and the arrow key into codes and transmit the codes to the game apparatus main body 1. Operation signals from the respective controllers 2 are used for moving the player characters and the like displayed in the relevant game. When a command for the subunit 3 is transmitted from the game apparatus main body 1, the controller 2 transmits the command to the subunit 3. Further, the controller 2 transmits and receives parameters specifying the game processing status, character setting data, and the like, to and from the game apparatus main body 1. The controller 2 is also composed such that it can read these parameters and the setting data from the backup memory 21 as well as write them in the backup memory 21. The detachable backup memory 21 can be connected to the controller 2 and is composed in a manner that it can be accessed from the CPU 101. The backup memory 21 is a storage area for storing the setting data that includes the progression and scores generated during the game, as well as the setting for the operation methods.

The setting data stored in the backup memory 21 serves as backup data for resuming the game from the point just before the power is turned off. Furthermore, by exchanging the backup memory 21 of the present game apparatus with a backup memory of another game apparatus, it is possible to realize operational status from the other game apparatus directly on the present game apparatus.

The subunit 3 serves as a submonitor apparatus for displaying subimages corresponding to commands transferred from the game apparatus main body 1 through the controller 2. The subunit 3 also serves as a portable game apparatus that can be operated independently.

Specifically, the subunit 3 comprises a CPU 30, an interface circuit 31, a RAM 32, a ROM 33, an oscillating circuit, a speaker 35, a piezoelectric driving circuit 36, a piezoelectric element 37, a liquid crystal 38, a submonitor 39 and an operational button group 40.

The interface circuit 31 is composed such that it can transmit and receive data to and from the controller 2.

The RAM 32 is an operation area for the CPU 30. The ROM 33 has a program stored therein for operating the subunit 3 as the portable game apparatus, and subimage data is also stored therein for operating the subunit 3 as the submonitor apparatus. This subimage data corresponds to images created by the game apparatus main body 1.

The oscillating circuit 34 is composed such that it can generate, under the control of the CPU 30, audio signals of a constant frequency and the speaker 35 is composed such that it can convert the audio signals to sounds. The oscillating circuit 34 and the speaker 35 are audio generating features and the audio generating features may have other structures, such as a buzzer and the like, as long as they can create sounds of a predetermined frequency (approximately 1 kHz) that the user can recognize.

The piezoelectric driving circuit 36 is composed to be able to generate, under the control of the CPU 30, drive signals of a constant frequency and these drive signals are input to the piezoelectric element 37 where they are converted to oscillations at a constant amplitude. The piezoelectric driving circuit 36 and the piezoelectric element 37 are oscillation generating features, and can generate predetermined oscillations in a manner that the user can recognize such oscillations, such as the vibration of mobile phones. These oscillation generating features may be realized in other structures such as eccentric motors.

The liquid-crystal driver 38 comprises a video memory and is composed such that it can update drawing data of the video memory under the control of the CPU 30. The submonitor 39 is composed to be able to display images of the drawing data stored in the video memory.

The liquid-crystal driver 38 and the submonitor 39 may be composed in a manner that the user can recognize writing and images, as in an LCD employed in a personal digital assistant.

The CPU 30 displays subimages that correspond to the game processing in the game apparatus main body 1, on the basis of a program stored in the ROM 33. Then, when a command is transmitted from the game apparatus main body 1 through the interface circuit 31, the CPU 30 reads from the ROM 33 new subimage data corresponding to the command, and updates the subimages for display on the submonitor 39. When the content of the command requests the sound generation, the CPU 30 causes the oscillating circuit 34 to generate sound to stimulate the hearing sense of the user. Further, when the content of the command requests the oscillation generation, the CPU 30 drives the piezoelectric driving circuit 36 to propagate oscillations to the user who is holding the subunit 3 to stimulate the touching sense of the user.

In the structure of FIG. 1, the subunit 3 is connected to the controller 2 through the connecting cable 160. However, it is also possible to integrally connect the subunit 3 to the controller 2 by housing the subunit 3 in the controller 2 at a predetermined position.

Embodiment 1

Figure 3:
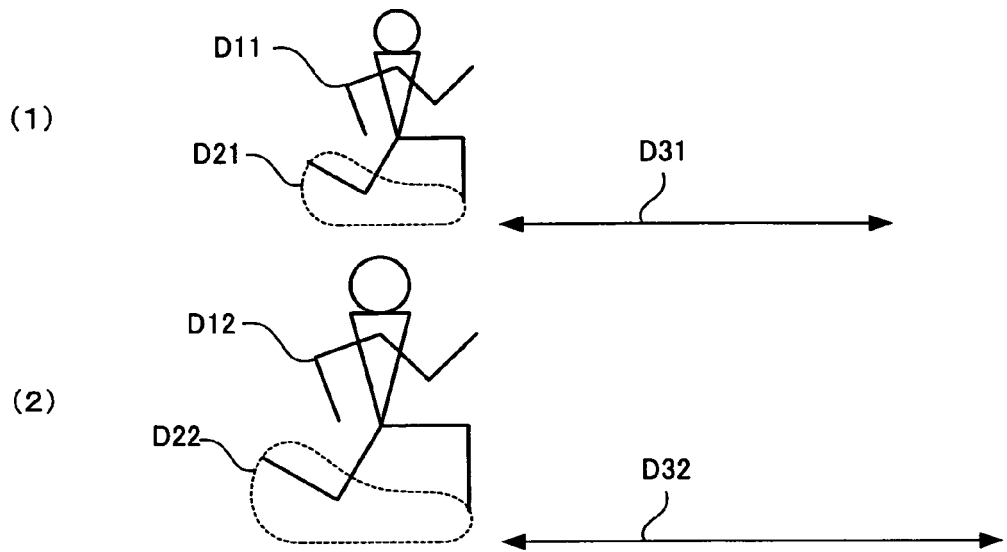
FIG. 3 illustrates a general idea of data used in the image processing apparatus and processing performed by the image processing apparatus in Embodiment 1.
Figure 4:
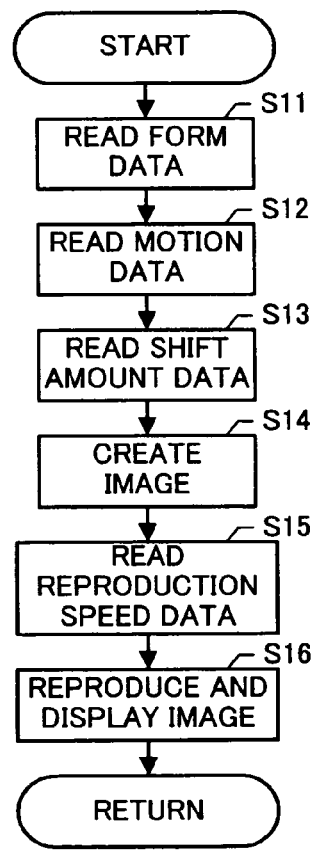
FIG. 4 is a flow chart of a processing procedure performed by the image processing apparatus in Embodiment 1.

FIG. 3 illustrates a general idea of data used in the image processing apparatus and image processing in Embodiment 1. FIG. 4 is a flow chart of a processing procedure by the image processing apparatus in Embodiment 1. Firstly, various data employed in the image processing apparatus of this embodiment will be explained with reference to FIG. 3.

Shape Data of Player Characters:

Shapes D11 and D12 are described as three-dimensional data formed by aggregation of multiple polygons. When expressing the individual characteristics of the player characters as differences in their shapes, it is necessary to provide individual player characters with different data for the body size, a uniform number, and even a face in some situations. In this case, it is desirable that the total amount of data be minimized by applying common data to the plurality of player characters in any way possible. For example, if a plurality of player characters has similar shapes with different sizes, the basic data having the shapes common to the player characters are described therein, is prepared. In this case, individual shapes of the players can be expressed by multiplying the basic data by parameters of individual sizes and attaching the texture of uniform numbers and faces to the basic data.

Motion Data for Player Characters:

The term, motion, of a player character, is here defined as a motion that does not involve shifting the location of the player character, for example, the motions of arm-swinging and feet hitting the ground when "running". Motions of player characters are realized by computation, such as multiplying coordinates of respective polygons constituting the shape data by a three-dimensional matrix. Motion data used specifically in this embodiment is common to all the player characters. Accordingly, the same motions apply to all the player characters, although there are scale differences depending on the size differences of the bodies of the player characters. In other words, the angle of arm and leg swinging as well as the timing thereof, is common to all the player characters. Virtual lines D21 and D22 shown in FIG. 3 indicate the paths of foot movement when common motion data is applied to a player character with a small body and a player character with a large body. As can be observed, the action of the player character with a large body, is more dynamic than that of the player character with a small body.

Shift Amount Data for Each Motion:

Shift amount data is data in which the shift amount per unit of motion for each motion, for example, shifting distances of one step when "running," D31 and D32, are described for each player character. The larger the body of a player character is, the larger a player character's shift amount will be. Preferably, the shift amount for each player character is proportional to the body size of the player character. Accordingly, the shift amount of one step for the player character with a large body is large, and that for the player character with a small body is small. Otherwise, consistency can not be ensured between the motion scale and the shift amount, thereby creating motions that may look as if the player character's feet are sliding on the ground. Regarding the shift amount data, it may be possible to apply common basic data for each motion to all the player characters. In this case, scaling of the shift amount for each player character is executed by multiplying the basic data by the size of the player character. Thereby, the shift amount for each player character can be calculated.

Figure 10:
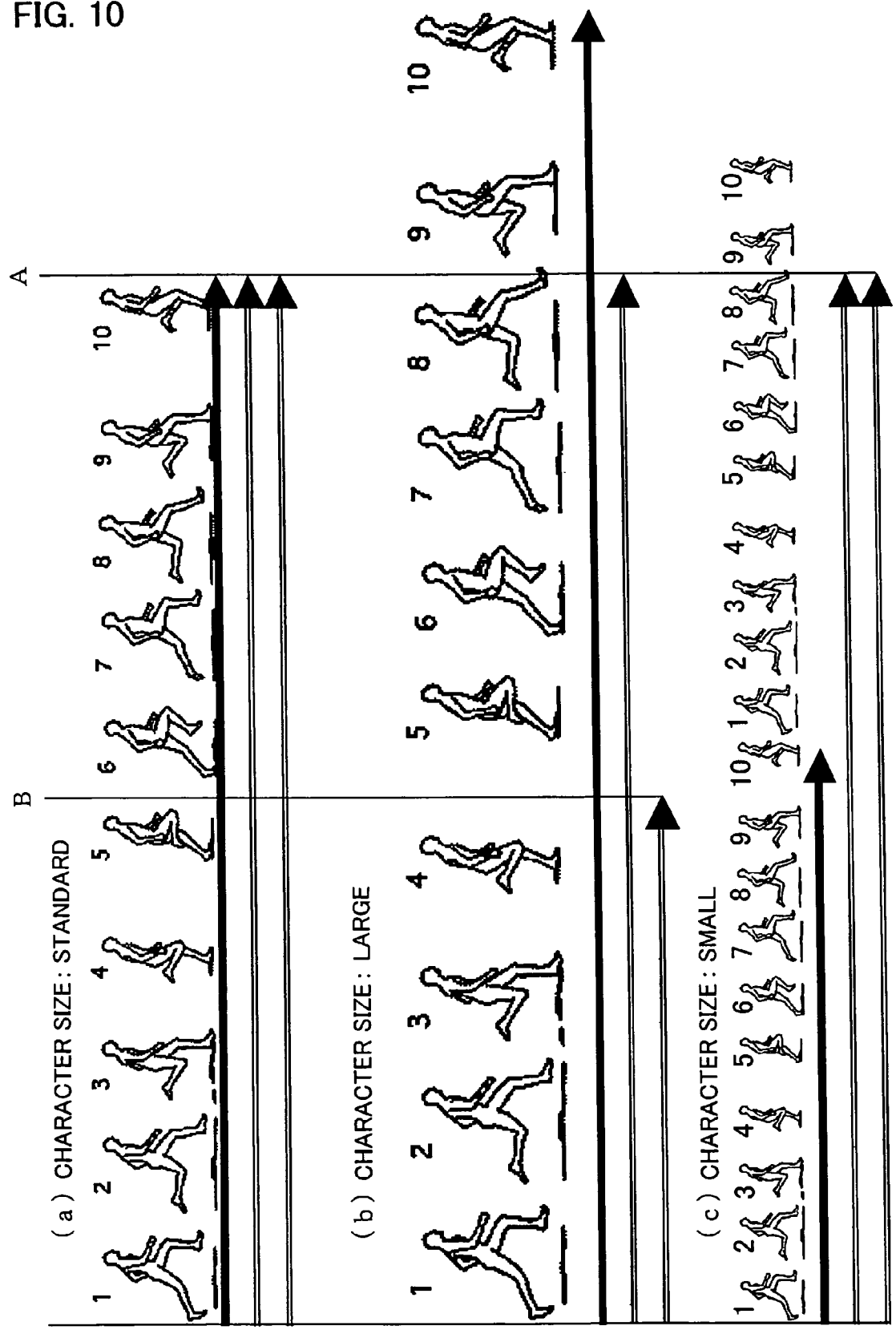
FIG. 10 illustrates animated images in single-frame advancing steps, being reproduced in accordance with shape data, motion, data and shift amount data in Embodiment 1.

By using this data, player characters' shapes described as the shape data, are moved in accordance with the motion data, and the player characters are shifted with the movements. FIG. 10 illustrates animated images in single-frame advancing steps, the animated images being reproduced in accordance with the shape data, the motion data and the shift amount data. The motion data is expressed as shape changes indicated by numbers 1 to 10. Character (b) with a larger body has a larger shift amount of one step compared to that of the character (a), and the character (c) with a small body has a smaller shift amount. Accordingly, it is possible to create natural "running" animated images for the player characters.

Reproduction Speed Data:

In Embodiment 1, a reproduction speed (motion displaying speed) for reproducing a motion of "running" for each player character and displaying it on a display apparatus (main monitor 113), is described for each player character. If common reproduction speed is applied to the player characters and if it is based on the aforementioned data, a player character with a large body consequently runs faster than a player character with a small body, therefore, it is impossible to express the characteristics of such player characters as player characters having small bodies but being able to run fast, and player characters having large bodies but being able to run only slowly. Thereupon, it is desirable that the reproduction speed is varied from one player character to another so that different reproduction speeds are applied to different player characters, in a manner that {body size (shift amount)×reproduction speed} is proportional to the running ability for each player character. In other words, a reproduction speed that is proportional to {running speed of a player character÷body size (shift amount)}, is set to each player character. For example, as shown in FIG. 10, if the running ability of the character (b) is inferior than that of the character (a), the reproduction speed of motions of the character (b) is made slower than that of the character (a). In other words, to make the character (b) reach only the point B by the time the character (a) reaches the point A, motions of the character (b) are reproduced only up to the reference symbol 4 while motions of the character (a) are reproduced up to the reference number 10. Accordingly, the player character having a small body but able to run fast, will have a short stride but the time spent in one step is less, whereas, the player character having a large body but being able to run only slowly, has a long stride but the time spent in one step is more.

It is also possible to apply different reproduction speeds to the same player character depending on the situation when the player character is running at its top speed and when the player character is running relatively slowly.

<Processing in Embodiment 1>

Next, the procedure of the image processing by the image processing apparatus in Embodiment 1 will be explained with reference to FIG. 4.

First, the image processing apparatus reads from a CD-ROM, shape data of player characters to be displayed (S11). The image processing apparatus also reads, from the CD-ROM, motion data that is common to all the player characters upon "running" (S12). Further, it reads, from the CD-ROM, data of shift amount of each motion for each player character (S13). Then, it creates images of the player characters in accordance with the data read (S14).

Next, the image processing apparatus reads, from the CD-ROM, reproduction speed data of each player character (S15). Then, it executes processing for reproducing the aforementioned created images at these reproduction speeds and displays the images on the main monitor 113(S16). Thereby, it is possible to display a state in which the respective player characters are running with running motions that conform to the body sizes, at different speeds that can be set irrespective of the body sizes.

Further, with regard to jumping of the player characters, if the motion data for jumping is made common for all the player characters, such jumping can merely be displayed so that the jumping heights depend on the body size. However, if different shift amount data (heights) of jumping is set for different player characters, it is possible to express jumping abilities that do not depend on the body sizes of the player characters. Upon expressing a jumping height of a player character in accordance with shift amount data of jumping, it is unnecessary to perform the scaling of the shift amount corresponding to the body size of the character, unlike the case of the shift amount data of "running". It is also possible to make a flight time correspond to a height of the jump, by adjusting the reproduction speed of jumping in accordance with the shift amount of jumping. Furthermore, the image processing of Embodiment 1 is not limited to competition games in which game media such as balls are used, but it can be applied to general image processing for displaying characters that are shifting with motions.

The aforementioned shift amount and the reproduction speed will be explained hereinafter by giving specific examples. It is assumed that Characters A to D having sizes and ability parameters indicated in "Table 1" are set.

TABLE 1

|  | Body height (cm) | Running ability (m/sec.) | Jumping ability (cm) | Turning speed |
|---|---|---|---|---|
| Character A | 200 | 10 | 100 | 1 |
| Character B | 200 | 20 | 200 | 2 |
| Character C | 100 | 10 | 100 | 1 |
| Character D | 100 | 20 | 80 | 1 |

In this case, if the shift amount and the reproduction speed for displaying a motion of Character A are used as the standard, the shift amounts and the reproduction speeds for displaying motions of each characters will be as indicated as in "Table 2".

TABLE 2

|  |  | Running | Jumping | Turning |
|---|---|---|---|---|
| Character A | Shift amount | ×1 | ×1 | 0 |
|  | Reproduction speed | ×1 | ×1 | ×1 |
| Character B | Shift amount | A × 1 | A × 2 | 0 |
|  | Reproduction speed | A × 2 | A × ½ | A × 2 |
| Character C | Shif amount | A × ½ | A × 1 | 0 |
|  | Reproduction speed | A × 2 | A × 1 | A × 1 |
| Character D | Shift amount | A × ½ | A × 0.8 | 0 |
|  | Reproduction | A × 4 | A × 1/0.8 | A × 1 |
| Determinants | Shift amount | Proportional body height to Character A | Proportional jumping ability to Character A | No shift involved (in situ motions only) |
|  | Reproduction speed | Proportional running ability to Charcater A ÷ Proportional body height to Character A (Shift amount multiplied by reproduction speed is propotional to running ability) | Inverse value of the propotional jumping ability to Character A (Shift amount multiplied by reproduction speed is constant) | Proportional turning speed to Character A |

In other words, with regard to running, if a character, like Character B, is as tall as the standard, its shift amount of one step conforms to the shift amount standard value, thereby preventing creation of actions that look as if the character's feet are "sliding." Since the running ability of Character B is twice the running ability standard value, if the reproduction speed is calculated to be twice the reproduction speed standard value, it is possible to express differences in the running abilities between Character A and Character B.

On the other hand, when a character, like Character C, has a body height that is ½ times the body height standard value, its shift amount of one step is made ½ times the shift amount standard value. Although the shift amount of one step of Character C is smaller than the shift amount standard value, the running ability of Character C is the same as that of the running ability standard value, therefore, if the reproduction speed of Character C is calculated to be twice the reproduction speed standard value, it is possible to express the same running ability as the reproduction speed standard value.

Accordingly, it is desirable that the shift amount of "running" of a given character be determined by the body height proportion of the given character to the standard. Further, it is desirable that the reproduction speed of the given character be determined by [running ability proportion of the given character to the running ability standard value÷body height proportion of the given character to the body height standard value]. Accordingly, the shift amount multiplied by the reproduction speed, is proportional to the running ability of the given character.

Accordingly, if the body height of a character, like Character D, is ½ times the body height standard value, its shift amount of one step is calculated to be ½ times the shift amount standard value. Since the running ability of Character D is twice the running ability standard value, the reproduction speed of Character D is calculated to be quadruple the reproduction speed standard value.

Next, jumping will be discussed. If the jumping ability of a character, like Character D, is twice the jumping ability standard value, its shift amount is calculated to be twice the shift amount standard value. Here, if Characters A and B have the same reproduction speed, then Characters A and B have the same amount of jumping motion time, that is, flight time, and thereby, create unnatural images. Thereupon, in Embodiment 1, such unnaturalness can be reduced by making the reproduction speed of jumping inversely proportional to the shift amount to realize a proportional relation between the jumping height and the flight time. Further, it is also possible to calculate flight time on the basis of a jumping height and the gravitational acceleration to reflect the calculated flight time on the reproduction speed.

On the other hand, if a jumping ability of a character, like Character C, is the same as the jumping ability standard value, its shift amount and reproduction speed are made to conform to those of the standard. This is because, regardless of the height of the character, its shift amount is determined by the jumping ability, and therefore, the flight time and the reproduction speed are determined on the basis of the calculated shift amount.

If the jumping ability of a character is 0.8 times the jumping ability standard value, as Character D, its shift amount is calculated to be 0.8 times the shift amount standard value and its reproduction speed is calculated to be 0.8 times the reproduction speed standard value.

Next, turning will be discussed. Turning is a motion made when a character changes its facing or running direction. Since turning is an in situ motion which does not involve shifting of a location of the character, the shift amount is 0 regardless of the body height of the character. If a turning speed of a character is the same as the turning speed standard value, like Characters C and D, its reproduction speed will be the same as the reproduction speed standard value. If a turning speed of a character is twice the turning speed standard speed, like Character B, its reproduction speed of the character is calculated to be twice the reproduction speed standard value. Accordingly, if it is a 180° turn, Character B takes half the time of Character A to turn its facing direction 180°.

Embodiment 2

Figure 5:
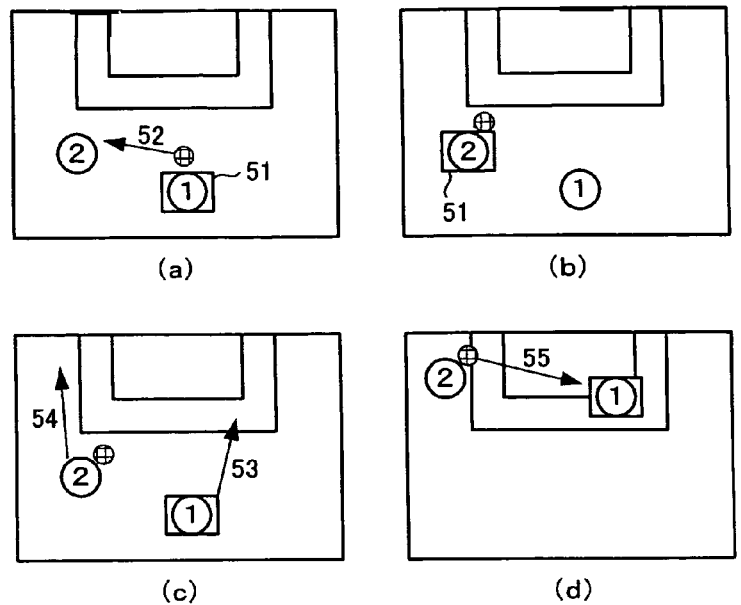
FIG. 5 shows examples of screens of a game apparatus in Embodiment 2.
Figure 6:
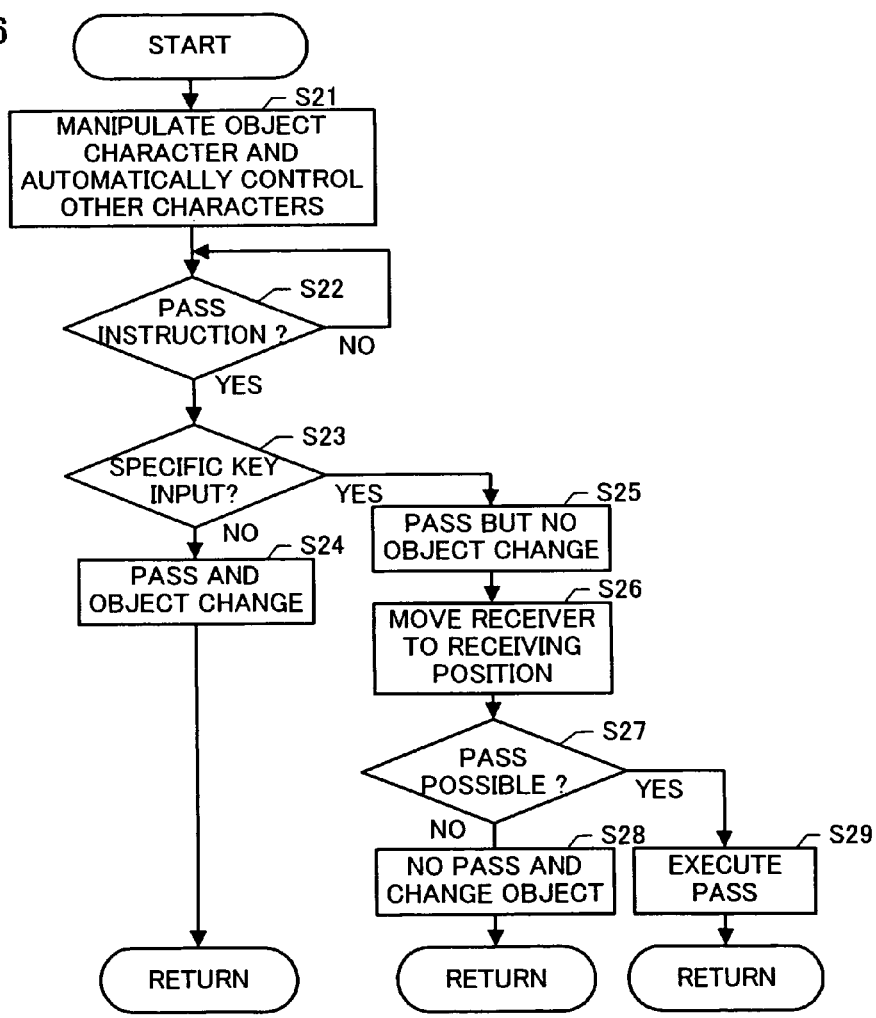
FIG. 6 is a flow chart of a processing procedure performed by the game apparatus in Embodiment 2.

FIG. 5 shows examples of screen compositions of a game apparatus in Embodiment 2. FIG. 6 is a flow chart of a processing procedure by the game apparatus in Embodiment 2.

As shown in FIG. 5, the game apparatus can simultaneously display plural player characters (1) and (2) and the like on the display apparatus (main monitor 113). In FIG. 5(a), it is assumed that the player character (1) is now controlling a ball, which is the game medium, and is about to pass the ball to the same team player character (2). At this time, the user is manipulating the player character (1) whereas the other player characters including the same team player character (2) are all being manipulated automatically by the computer. A marker 51 is attached onto the player character (1), which is being manipulated by the user, to indicate that the player character (1) is the object of the user's manipulation.

At this point, when the user makes a normal pass instruction to pass the ball from the player character (1) to the player character (2) (arrow 52), the object of manipulation by the user moves from the player character (1), who is the passer, to the player character (2) who is the receiver (FIG. 5(b)). Therefore, the marker 51 attached to the player character (1) moves to the player character (2). Then, the user manipulates the player character (2) and all the other player characters are automatically manipulated by the computer. The normal pass instruction is made by pressing a pass execution key, which is properly designated as one of the keys within the operational button group 22 of the controller 2.

When the player character (1) is controlling the ball, if the user makes a pass instruction (arrow 52) to the player character (2) while pressing a specific key of the controller 2, the object of manipulation by the user remains the player character (1) who made the pass (FIG. 5(c)). This specific key is properly designated as one of the keys within the operational button group 22 excluding the aforementioned pass execution key. The player character (2) who receives the ball continues to be automatically controlled by the computer. At this time, the user can manipulate the player character (1) who is not controlling the ball to, for example, run into a space where he can receive the ball from the player character (2) (arrow 53). The computer which is automatically manipulating the player character (2) who is controlling the ball, makes the player character (2) do things such as taking the offensive by dribbling forward (arrow 54) or passing the ball to another same team player character, in accordance with a programmed game strategy selected depending on the game situation. When the user's manipulation of the player character (1) corresponds to the game strategy of the computer, for example, when the user makes the player character (1) run into the space to where the computer is planning to make the player character (2) pass the ball, the computer makes the player character (2) pass the ball to the player character (1) (FIG. 5(d); arrow 55). If during the play, the user releases the specific key, the object of the user's manipulation transfers to the player character who is controlling the ball, in this case, to the player character (2), and thus the marker also transfers to the player character (2).

<Processing in Embodiment 2>

Next, a processing procedure performed by the game apparatus in Embodiment 2 will be explained with reference to FIG. 6. For convenience, the same reference numerals of the player characters explained in FIG. 5 are properly used.

The game apparatus displays on the display apparatus (main monitor 113) images with a central focus on the player character (1) who is controlling the ball. The game apparatus also accepts manipulations by the user as the manipulations of the player character (1) who is controlling the ball, and executes the processing in accordance with the user's manipulations. In this case, in order to identify the object which the user is manipulating, the game apparatus displays a marker in a manner so that it follows the player character (1). Further, the game apparatus automatically manipulates the other player characters including the player character (2) who are not being manipulated by the user, in accordance with the program (S21). This processing is executed while the game is in progress (that is, if one user is playing the game against the computer, the processing is always executed while the team being manipulated by the user is controlling the ball.)

When the user gives a pass instruction (S22), the game apparatus determines whether or not the specific key has been pressed at the same time (S23). If the specific key has not been pressed, the game apparatus executes the pass from the player character (1) to another player character such as the player character (2). Then, the game apparatus changes the object of the user's manipulation from the player character (1) to the player character (2) and the marker indicating the object of the user's manipulation also transfers from the player character (1) to the player character (2) (S24). Furthermore, the game images to be displayed, become game images centered around the player character (2).

If it is determined at S23 that the specific key has been pressed, the game apparatus executes the pass from the player character (1) to another player character such as the player character (2), however, the object of the user's manipulation will remain the player character (1) who made the pass (S25). Also, the marker indicating the object of the user's manipulation does not transfer to the player character (2) who received the pass but remains attached to the player character (1). In the game images, the player character (2) who is controlling the ball and the player character (1) being manipulated by the user are evenly displayed, or either the player character (2) controlling the ball or the player character (1) being manipulated by the user (1) becomes the main focus in the displayed images. Furthermore, a window, such as FIG. 5(c), which indicates only locations of the other player characters on the ground, will be separately displayed.

If the user subsequently releases the specific key, the object of manipulation by the user changes from the player character (1) to the player character (2) who is controlling the ball (not shown). In other words, the user needs to keep the specific key pressed if he/she wishes to continue manipulating the player character (1) who made the pass.

The player character (2) who received the pass, is automatically controlled by the computer in accordance with the programmed game strategy which is selected depending on the game situation. For example, the computer expects that a same team player character runs into a space where there are no other player characters from either team, or the computer searches for a same team player character which no player characters of the opponent team are covering (that is, a same team player character who is free). The game apparatus performs processing such as making the player character (2) dribble forward to the aforementioned space or to a position (pass-making position) where the player character (2) can pass the ball to a same team player character who is free (S26).

When the player character (2) who received the pass reaches the pass-making position, the game apparatus determines whether or not the player character (1) being manipulated by the user is at the position where he can receive the pass from the player character (2) (S27). If the player character (1) is not at this position, the pass is not made to the player character (1). Then, the object of manipulation by the user changes from the player character (1) to the player character (2) who is controlling the ball, and the marker also transfers to the player character (2) (S28).

At S27, if the player character (1) is at the position where he can receive the pass from the player character (2), the game apparatus executes the pass to the player character (1) who is being manipulated by the user, and so that now, the player character (1) controls the ball (S29). After the processing is executed, even if the specific key is released, the object of the user's manipulation will remain the player character (1) who is controlling the ball.

In Embodiment 2, the game apparatus determines whether or not the pass can be made to the player character (1) when the player character (2) reaches the pass making position. However, without limitations to this processing, the game apparatus may make this decision when the user requests to receive the pass by pressing a pass-requesting key at an arbitrary timing.

Through the aforementioned processing, the user can develop game strategies such as making the player character manipulated by him/herself receive a cross ball, or pass the ball to another player character so that his/her player character can run into the center area, or passing the ball to a player character behind his/her player character so that his/her player character can run out to an open space.

Embodiment 3

Figure 7:
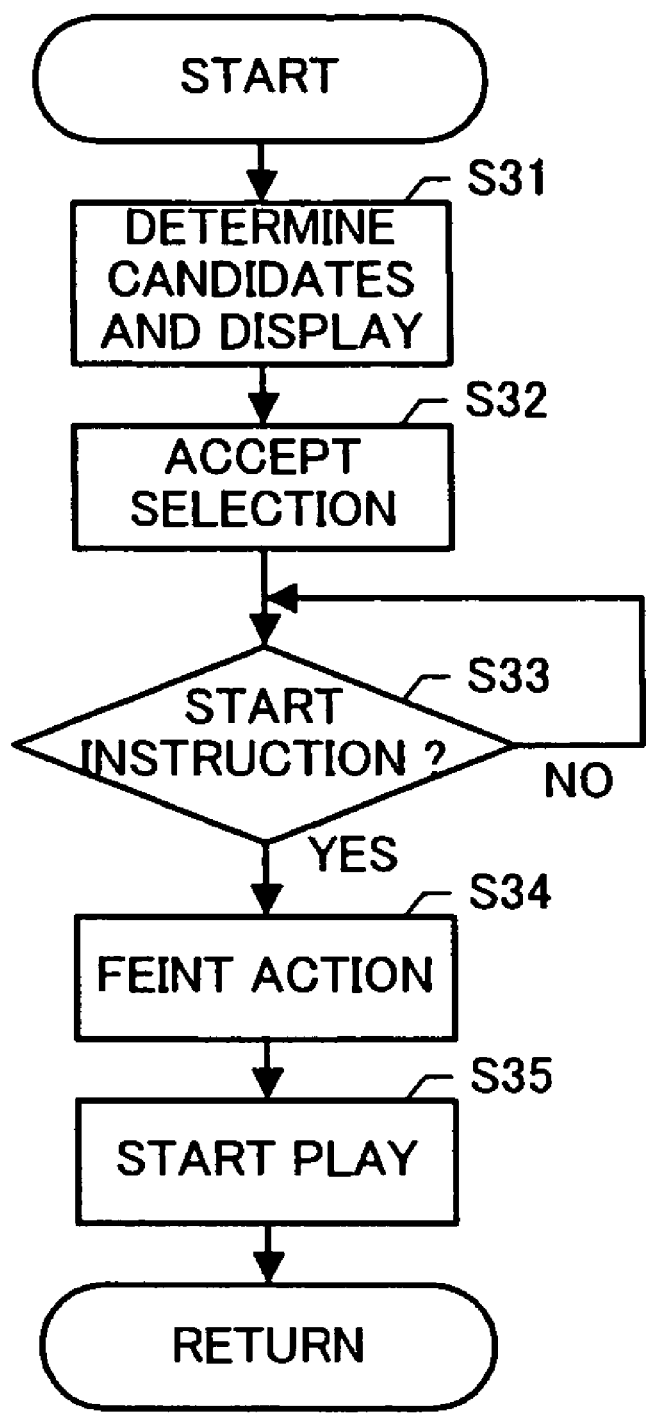
FIG. 7 is a flow chart of a processing procedure performed by a game apparatus in Embodiment 3.

FIG. 7 is a flow chart of a processing procedure by a game apparatus in Embodiment 3. In this embodiment, first and second users manipulate player characters of competing first and second teams respectively, and the users can select player characters who will perform a predetermined play on the submonitor 39 which cannot be seen by the other user.

The game apparatus displays on the main monitor 113, a display device, candidates for a player character who will perform a predetermined play (S31). Particularly preferable examples of the predetermined plays are those plays in which timing and the player character who will perform the play can be chosen arbitrarily from a certain range, for example, free kicks in soccer and attacks in volleyball. Explanations are based on an example of a free kick in soccer. Selection of candidates may be automatically made by the game apparatus, on the basis of rules of team ball sports or on the basis of the strong and weak points of the respective player characters. Otherwise, such selection may be made by the user who is manipulating the player characters of his/her own team. For example, in the case of a free kick in soccer, on the main monitor 113, two player characters are displayed side by side near the position where the ball is located.

Next, the game apparatus determines, based on a selection manipulation by the user, which player character among the selected candidate characters, will perform the predetermined play (S32). The selection manipulation is performed in a manner that the other user cannot see which player character has been selected. For example, each user chooses a player's number on the submonitor 39 by the controller 2 that the user is manipulating. In this case, the user requests to start the predetermined play by a separate instruction. In another example of the selection manipulation, the main monitor 113 or the submonitor 39 displays the designation of the selected candidate player characters to the respective operational keys. In this case, the user's manipulation of one of the designated keys covers both a selection of a player character and a request to start the predetermined play. The other user can also see the main monitor 113. However, the main monitor 113 displays only the allocation of operational keys, therefore, the other user cannot see which player character is to be selected.

Together with the selection of the player character on the submonitor 39, details of the play may also be selected. For example, in the case of a free kick in soccer, a direction to kick the ball (for example, which part of the goal net to be targeted when the user can aim at the goal directly) can be selected. It is also possible that, in exchange for allowing the computer to decide details of the play by the selected player character rather than the user deciding by himself/herself, the user may manipulate other characters in the same team except the selected player characters. Accordingly, in a case of an indirect free kick, for example, the character in the same team can aim at the goal after receiving the ball from the selected kicker. Furthermore, it is also possible to store, in a storage apparatus such as the backup memory 21 in the controller 2, several patterns of detailed selection manipulations made by the user, so that the user can select one from these stored selection manipulations.

When an instruction is made to begin the predetermined play according to a key manipulation by the user (S33), the game apparatus displays a feint action of a candidate character who is different from the selected player character (S34). In an example of the feint action, in the case of a free kick in soccer, any one of the candidate characters excluding the selected player character runs to the position where the ball is placed to make a feint action by striking at air.

It is possible to adopt the configuration in which the user can select in each case whether or not the feint action will be displayed. When the user selects non-display of the feint action, the selected player character will begin the predetermined play.

Further, when displaying the feint action, the user may select in each case which player character will do such feint action. Furthermore, a plurality of player characters may be selected to make feint actions and the user may select an execution sequence of the feint actions of the plural player characters.

In the case where the feint action is performed, the selected player character starts the predetermined play (S35) immediately after the feint action begins. Specifically, in the case of a free kick in the soccer game, running and kicking of the selected player character are displayed in a manner that the selected player character kicks the ball immediately after the player character who performs the feint action strikes the air. A feint action is not necessarily made before the performance of the selected player character. The feint action includes a case in which any one of the other candidate characters starts running to the position where the ball is placed right after the selected player character starts to run up to kick the ball.

In the case of a free kick, if a direction to kick the ball can be selected on the submonitor 39, the analog key 24 can be used for other purposes except for determining the direction to kick the ball. For example, it is possible to reflect a rotating direction of the analog key 24 onto the rotating direction of the ball. In other words, if the analog key 24 is rotated to the right, the ball spins to the right, thereby curving to the right. If the analog key 24 is rotated to the left, the ball spins to the left, thereby curving to the left. If the analog key 24 is rotated upward, the ball moves with topspin, and if the analog key 24 is rotated downward, the ball moves with underspin.

Embodiment 4

Figure 8:
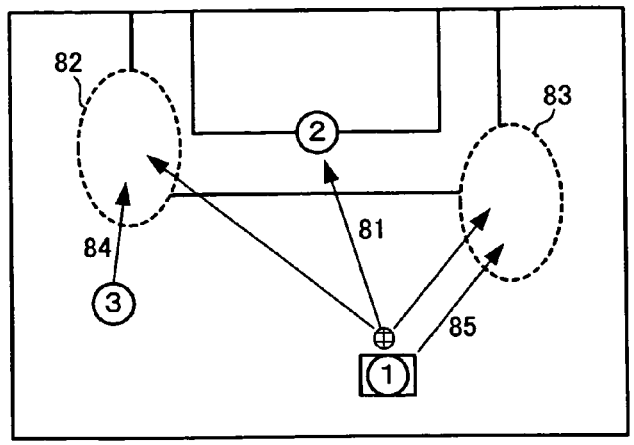
FIG. 8 illustrates the general idea of a search pass and a through pass in Embodiment 4.
Figure 9:
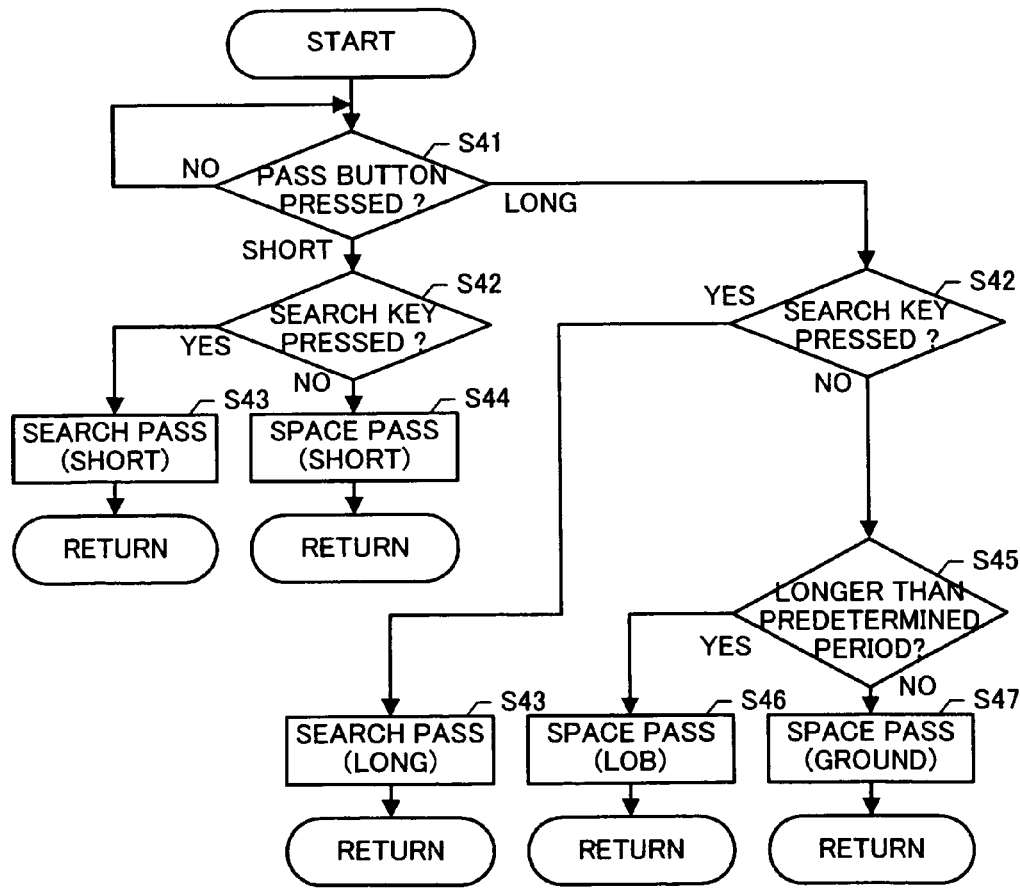
FIG. 9 is a flow chart of a processing procedure performed by a game apparatus in Embodiment 4.

FIG. 8 illustrates a general idea of a search pass and a through pass in Embodiment 4. FIG. 9 is a flow chart of a processing procedure by a game apparatus in Embodiment 4.

As shown in FIG. 8, when the player character (1) is controlling the ball, if the user presses a search key for passing the ball, the computer automatically searches for a player character to whom the ball can be passed. The search key is a key that is properly designated within, for example, the operational button group 22. As a result of pressing the search key, the computer finds a same team player character (2) who is free, and the user designates the player character (2) and makes a pass instruction, then the computer executes the pass from the player character (1) to the player character (2) (arrow 81). This manipulation is the search pass.

On the other hand, when the player character (1) is controlling the ball, the user may input a command to perform a space pass. A space pass is a pass when a same team player character to whom the ball can be passed is not designated and the ball is kicked to a space (such as 82 or 83) located in a certain direction away from the player character who is controlling the ball. In order to use this pass in a game strategy, it is necessary to make a same team player character (3) run into a space to where the pass was made (arrow 84), or the player character (1) who made the original pass must run to the space to where the pass was made (arrow 85).

In Embodiment 4, in addition to the search key, a short pass key and a long pass key are also designated within the operational button group 22. If both the search key and the short pass execution key are pressed at the same time, the computer searches for a same team player character who is located near the player character controlling the ball and executes a short pass to the specified player character. If both the search key and the long pass execution key are pressed at the same time, the computer searches for a same team player character who is located far from the player character controlling the ball and executes a long pass to the specified player character.

When only the short pass execution key is pressed without the search key being pressed, the computer considers it a command for a space pass and executes a short space pass in a certain direction which, for example, the analog key 24 directs. Likewise, when only the long pass execution key is pressed without the search key being pressed, the computer executes a long space pass in a direction which, for example, the analog key 24 directs. When the user uses the analog key 24 as a means for indicating a running direction of the player character manipulated by the user, the direction of the pass will be the same as the running direction of the player character being manipulated by the user. However, it is also possible to specify a direction of the pass by operating keys that are unrelated to the running direction of the player character being manipulated by the user.

Furthermore, when the search key, analog key 24, and the short pass key or the long pass key are operated at the same time, it is also possible to adopt the configuration in which the computer searches for and specifies a player character to whom the ball will be passed, from the same team player characters located in the direction specified by the user with the analog key 24.

<Processing in Embodiment 4>

Concrete processing in Embodiment 4 will be explained on the basis of FIG. 9. When the user controls the player character who is controlling the ball, the game apparatus in Embodiment 4 determines whether or not the pass execution key (short or long) has been pressed (S41). When the pass execution key is pressed, the computer determines whether or not the search key has been pressed at the same time (S42). When the search key has been pressed, the computer executes a short or long search pass to a designated player character (S43).

In the case when the search key has not been pressed at S42 and the pass execution key pressed is the short pass execution key, the computer refers to an input value of the analog key 24 at the time when the short pass execution key was pressed, and executes the processing to execute a short space pass (S44).

In the case when the search key has not been pressed at S42 and the pass execution key pressed was the long pass execution key, the computer determines whether or not the long pass execution key has been pressed for more than a predetermined period of time (S45). The predetermined period of time is set to, for example, 0.5 seconds or more. If the long pass execution key has been pressed for more than the predetermined period of time, the computer refers to the input value of the analog key 24 at the time when the pass execution key was pressed, and executes the processing to execute a long space pass. Particular to this case, the computer makes a pass (lob) in a manner that the ball is kicked high in the air (S46). If the long pass execution key was pressed at S45 for the predetermined period of time or less, the computer refers to the input value of the analog key 24 at the time when the pass execution key was pressed, and executes the processing to execute a long space pass. In this case, the computer makes a pass (ground ball) in a manner that the ball is not kicked in the air (S47). By determining a travel path of the ball in accordance with the time length during which the long pass execution key has been pressed, the user can enjoy a game that is rich in diversity.

The aforementioned processing is not limited to passing of the ball, but it can also be applied to a throw-in action in soccer games. In other words, designations of the operational keys are performed in a manner that when the short pass execution key is pressed, the ball is thrown to a place close to the thrower, and on the other hand, when the long pass execution key is pressed, a long throw is made. The designation of the keys are set in a manner that when the search key is pressed simultaneously with the short pass execution key or the long pass execution key, the ball is thrown to a specified same team player character, and on the other hand, when the short pass execution key or the long pass execution key is pressed without the search pass key, then the ball is thrown to a space in a direction specified by the analog key 24. Accordingly, a long throw, which cannot be realized in conventional game apparatuses, can be realized with a manipulation that is as simple as the manipulations to make a pass.

According to the present invention, the enjoyment can be enhanced for a game apparatus which simulates a team sports such as soccer. Moreover, the present invention provides an image processing apparatus which is preferable for such game apparatus and the like.

The invention claimed is:

1. An image processing method for creating an animated image of a character in accordance with:
   shape data of the character;
   motion data indicating variations per unit of time of the shape data for a predetermined motion of the character in a virtual space;
   motion displaying speed data indicating a speed to display the predetermined motion in accordance with the motion data;
   shift amount data indicating a shift amount per unit of motion for the predetermined motion of the character; and
   ability data indicating a shift amount per unit of time for the predetermined motion of the character;
   wherein, size data indicating a character size in the virtual space and the ability data are individually set for different characters, and the method comprises:
      a step for creating, by a processor, second shift amount data by changing the shift amount data in accordance with the size data;
      a step for creating, by the processor, second motion displaying speed data by changing the motion displaying speed data in accordance with the ability data; and
      a step for creating, by the processor, in accordance with the second shift amount data and the second motion displaying speed data, an animated image of the character shifting with the predetermined motions.

2. The image processing method according to claim 1, wherein a plurality of types of predetermined motions are set and the method further comprises a step for determining whether or not said changing of the motion displaying speed data is needed, in accordance with the types of the predetermined motions.

3. The image processing method according to claim 1 or 2, wherein a plurality of characters are displayed and, for a motion common to the plurality of characters, common motion data is provided to the plurality of characters irrespective of the character size.

4. An image processing method for creating an animated image of a running character in accordance with:
   shape data of the character;
   running motion data indicating variations per unit of time of the shape data of the running motion for the character in a virtual space;
   running motion displaying speed data indicating a speed to display the running motion in accordance with the running motion data;
   stride data indicating a shift amount of each stride for the running motion of the character; and
   running ability data indicating a distance traveled per unit of time for the running motion of the character,
   wherein, size data indicating a character size in the virtual space and the running ability data are individually set for different characters, and the method comprises:
      a step for creating, by a processor, second stride data by changing the stride data in accordance with the size data;
      a step for creating, by the processor, second running motion displaying speed data by changing the running motion displaying speed data in accordance with the running ability data; and
      a step for creating, by the processor, in accordance with the second stride data and the second running motion displaying speed data, an animated image of the running character.

5. An image processing method, comprising:
   creating, by a processor, an animated image for each of a plurality of characters in accordance with shape data of the plurality of characters shifting with predetermined motions in a virtual space, motion data indicating variations per unit of time of the shape data for the predetermined motions of the plurality of characters in the virtual space, and shift amount data indicating a shift amount for each of the predetermined motions of each of the plurality of characters; and
   displaying the animated image of each of the plurality of characters on display means,
   wherein, the plurality of characters have shapes different in size; the motion data is common to all the plurality of characters; the shift amount data is a shift amount proportional to a character size; and, when creating the animated image, a reproduction speed of the animated image for each of the plurality of characters changes in accordance with the shift amount data of the each character.

6. An image processing method, comprising:
   creating, by a processor, an animated image for each of a plurality of characters in accordance with shape data of the plurality of characters that are set in different sizes and shifting with predetermined motions in a virtual space, motion data indicating variations per unit of time of the shape data for the predetermined motions of the plurality of characters in the virtual space, and shift amount data indicating a shift amount for each of the predetermined motions of each of the plurality of characters; and
   displaying the animated image of each of the plurality of characters on display means,
   wherein, when creating the animated image, scaling of the shift amount data is performed and a reproduction speed of the animated images changes in accordance with a character's size.

7. The image processing method according to claim 6, wherein a plurality of types of predetermined motions are set and the method further comprises:
   determining whether or not to perform the scaling of the shift amount data in accordance with each character's size, depending on the types of the predetermined motions.

8. The image processing method according to claim 6 or 7, wherein creating the animated image further includes:
   scaling the shift amount data by using the shape data.

9. An image processing apparatus comprising:
   means for creating an animated image of a character in accordance with shape data of the character shifting with a predetermined motion in a virtual space, motion data indicating variations per unit of time of the shape data for the predetermined motion of the character in the virtual space, and shift amount data indicating a shift amount per unit of motion for the predetermined motion of the character;
   means for changing a reproduction speed of the animated image in accordance with a character size; and
   means for creating the animated image of the character by using the reproduction speed based on the character size.

10. The image processing apparatus according to claim 9, wherein a plurality of types of predetermined motions are set and the apparatus further comprises:

means for determining whether or not said changing of the reproduction speed in accordance with the types of the predetermined motions is needed.

11. The image apparatus according to claim 9 or 10, wherein a plurality of characters are displayed and, for a motion common to the plurality of characters, common motion data is provided to the plurality of characters irrespective of character size.

12. An image processing apparatus comprising:
   image creation means for creating an animated image of a character in accordance with shape data of the character shifting with a predetermined motion in a virtual space, motion data indicating variations per unit of time of the shape data for the predetermined motion of the character in the virtual space, and shift amount data indicating a shift amount for the predetermined motion of the character; and
   display means for displaying a plurality of animated images of the character,
   wherein a plurality of characters have shapes different in size; the motion data is common to all of the plurality of characters; the shift amount data is set to a shift amount proportional to a character size; and the image creation means changes a reproduction speed of the animated image of each of the plurality of characters in accordance with the shift amount data of the each character.

13. An image processing apparatus comprising:
   image creation means for creating an animated image for each of a plurality of characters in accordance with shape data of the plurality of characters that are set in different sizes and shifting with predetermined motions in a virtual space, motion data indicating variations per unit of time of the shape data for the predetermined motions of the plurality of characters in the virtual space, and shift amount data of a shift amount for each of the predetermined motions of each of the plurality of characters; and
   display means for displaying the animated image of each of the plurality of characters,
   wherein, the image creation means performs scaling of the shift amount data and changes a reproduction speed of the animated image in accordance with a character's size.

14. The image processing apparatus according to claim 13, wherein a plurality of types of predetermined motions are set and the apparatus further comprises:
   determination means for determining whether or not to perform the scaling of the shift amount data in accordance with the character's size, depending on the types of the predetermined motions.

15. The image processing apparatus according to claim 13 or 14, wherein the image creation means performs the scaling of the shift amount data by using the shape data.

* * * * *